United States Patent
Shao et al.

(10) Patent No.: US 11,546,005 B1
(45) Date of Patent: Jan. 3, 2023

(54) DIGITAL RADIO-FREQUENCY TRANSMITTER

(71) Applicant: Shenzhen Giant Microelectronics Company Limited, Guangdong (CN)

(72) Inventors: Hui Shao, Guangdong (CN); Lefeng Shen, Guangdong (CN); Shaohua Zhao, Guangdong (CN); Weimin Zhang, Guangdong (CN)

(73) Assignee: Shenzhen Giant Microelectronics Company Limited, Shenzhen (CN)

( * ) Notice: Subject to any disclaimer, the term of this patent is extended or adjusted under 35 U.S.C. 154(b) by 0 days.

(21) Appl. No.: 17/851,009

(22) Filed: Jun. 27, 2022

(30) Foreign Application Priority Data

Jul. 1, 2021 (CN) .......................... 202110743282.4

(51) Int. Cl.
*H04B 1/04* (2006.01)
*H04B 1/00* (2006.01)

(52) U.S. Cl.
CPC .......... *H04B 1/0458* (2013.01); *H04B 1/0057* (2013.01); *H04B 1/0082* (2013.01); *H04B 2001/0408* (2013.01)

(58) Field of Classification Search
CPC .......... H04B 1/02; H04B 1/04; H04B 1/0057; H04B 1/0082; H04B 1/0458; H04B 2001/0408; H03M 1/66; H04L 17/00; H04L 17/02; H04L 27/00; H04L 27/20
See application file for complete search history.

(56) References Cited

U.S. PATENT DOCUMENTS

| | | | | | |
|---|---|---|---|---|---|
| 5,053,983 | A * | 10/1991 | Hyatt | ...................... | G10L 19/00 |
| | | | | | 708/321 |
| 6,434,187 | B1 * | 8/2002 | Beard | ..................... | H04B 1/403 |
| | | | | | 455/86 |
| 8,204,148 | B2 * | 6/2012 | Goodman | ........... | H04L 27/3411 |
| | | | | | 455/114.3 |
| 9,337,874 | B1 * | 5/2016 | Yu | ........................ | H03M 1/0863 |
| 9,813,086 | B2 * | 11/2017 | Lu | ......................... | H04B 1/0475 |
| 10,804,864 | B2 * | 10/2020 | Yoo | .......................... | H04B 1/04 |
| 11,159,126 | B2 * | 10/2021 | Chen | ...................... | H03F 1/0277 |

* cited by examiner

*Primary Examiner* — Quochien B Vuong (57) ABSTRACT

Disclosed is a digital radio-frequency transmitter, which includes a digital logic mixer, a digital power amplifier and an antenna, wherein an output terminal of the digital logic mixer is connected with an input terminal of the digital power amplifier; an output terminal of the digital power amplifier is connected to the antenna; the digital logic mixer is configured to perform logic mixing on baseband data and a radio-frequency local oscillator clock signal which are input into the digital radio-frequency transmitter to generate radio-frequency data; the digital power amplifier is configured to convert the radio-frequency data into an analog power signal; and the antenna is configured to transmit the analog power signal out. According to the digital radio-frequency transmitter of the present application, the circuit layout area and the circuit operation consumption can be effectively reduced.

20 Claims, 5 Drawing Sheets

DIGITAL RADIO-FREQUENCY TRANSMITTER

CROSS REFERENCE TO RELATED APPLICATIONS

The present application claims the priority of Chinese Patent Application No. 202110743282.4 filed on Jul. 1, 2021. The contents of the above application are hereby incorporated by reference.

TECHNICAL FIELD

The present application relates to the field of communication technologies, and more particularly, to a digital radio-frequency transmitter.

BACKGROUND ART

Figure 1:
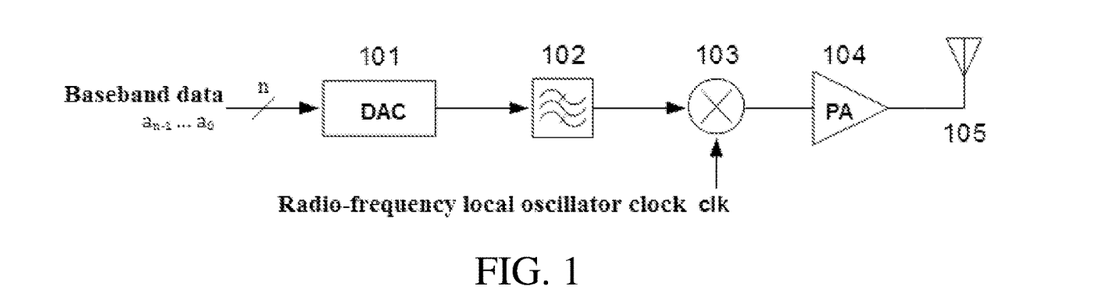
FIG. 1 is a schematic structural diagram of a traditional radio-frequency transmitter.

Wireless radio-frequency communication has been applied more and more extensively in daily life. The implementation of radio-frequency protocols such as wifi, bluetooth, ultra-wideband (UWB), etc., used in different applications, depends on a receiving and transmitting chip for radio frequency signals. As shown in FIG. 1, the traditional wireless radio-frequency transmitter chip architecture includes a digital-to-analog conversion circuit (DAC) 101, a low-pass filter (LPF) 102, a mixer 103, a power amplifier 104, an antenna 105, etc.; and the respective modules are generally implemented by an analog circuit. The circuit structure is complex, a desired layout area is large, and the power consumption during operation is relatively large. In addition, the noise generated by the analog circuit and the leakage of a radio-frequency clock at an input terminal of the mixer to the output of the mixer will affect the quality of a transmission signal output by a radio-frequency transmitter.

The disclosure of the above background art is only used to assist in understanding the concept and the technical solution of the present application, and does not necessarily belong to the prior art of the present application. In the absence of a clear evidence indicating that the above content has been disclosed on the filing date of the present application, the above background art should not be used to evaluate the novelty and inventiveness of the present application.

SUMMARY OF THE INVENTION

In order to solve the problems of the above traditional radio-frequency transmitters, the present application provides a digital radio-frequency transmitter, which can effectively reduce a circuit layout area and the circuit operation consumption.

To fulfill said objective, the present application adopts the following technical solutions.

The present application discloses a digital radio-frequency transmitter, which includes a digital logic mixer, a digital power amplifier and an antenna, wherein an output terminal of the digital logic mixer is connected with an input terminal of the digital power amplifier; an output terminal of the digital power amplifier is connected to the antenna; the digital logic mixer is configured to perform logic mixing on baseband data and a radio-frequency local oscillator clock signal which are input into the digital radio-frequency transmitter to generate radio-frequency data; the digital power amplifier is configured to convert the radio-frequency data into an analog power signal; and the antenna is configured to transmit the analog power signal out.

Preferably, the baseband data input to the digital radio-frequency transmitter is data that is digitally filtered through a digital filtering algorithm.

Preferably, the digital logic mixer includes a first logic AND gate and a first multiplexer, wherein a first input terminal of the first logic AND gate is the baseband data, a second input terminal of the first logic AND gate is connected to an output terminal of the first multiplexer, and an output terminal of the first logic AND gate is configured to output the radio-frequency data; a first input terminal of the first multiplexer is connected to the radio-frequency local oscillator clock signal, and a second input terminal of the first multiplexer is connected to an inversion signal of the radio-frequency local oscillator clock signal; and the first multiplexer is configured to select the radio-frequency local oscillator clock signal or the inversion signal of the radio-frequency local oscillator clock signal according to a sign bit of the baseband data.

Preferably, the digital logic mixer further includes a second logic AND gate and a second multiplexer, wherein a first input terminal of the second logic AND gate is the baseband data, a second input terminal of the second logic AND gate is connected to an output terminal of the second multiplexer, and an output terminal of the second logic AND gate is configured to output the radio-frequency data; a first input terminal of the second multiplexer is connected to an inversion signal of the radio-frequency local oscillator clock signal, and a second input terminal of the second multiplexer is connected to the radio-frequency local oscillator clock signal; and the second multiplexer is configured to select the inversion signal of the radio-frequency local oscillator clock signal or the radio-frequency local oscillator clock signal according to the sign bit of the baseband data.

Preferably, the digital power amplifier includes a transformer and $2^n-1$ identical amplifier units, n being a number of bits of the radio-frequency data; and the $i^{th}$ radio-frequency data controls $2^i$ amplifier units, $0 \le i \le n-1$.

Preferably, each amplifier unit includes a switching tube, a current regulation module and an isolation module; an input terminal of the switching tube is connected to the radio-frequency data; the current regulation module is connected to the switching tube and configured to adjust a current of each of the amplifier units; and the isolation module is connected between an input terminal of the transformer and an output terminal of the switching tube and configured to isolate the switching tube from the transformer.

Preferably, each amplifier unit includes a first MOSFET, a second MOSFET, a third MOSFET and a fourth MOSFET; a gate of the first MOSFET and a gate of the second MOSFET are connected to the radio-frequency data respectively; a gate of the third MOSFET and a gate of the fourth MOSFET are connected to a voltage $V_B$ respectively; a source and a drain of the first MOSFET are connected to a ground and the third MOSFET respectively; a source and a drain of the second MOSFET are connected to the ground and the fourth MOSFET respectively; a source and a drain of the third MOSFET are connected to the first MOSFET and a positive output $V_{OP}$ respectively; a source and a drain of the fourth MOSFET are connected to the second MOSFET and a negative output $V_{ON}$ respectively; the positive output $V_{OP}$ and the negative output $V_{ON}$ are connected to a positive terminal and a negative terminal of a primary side of the transformer respectively; and the gates of the respective MOSFETs in the $2^i$ amplifier units controlled by the $i^{th}$ radio-frequency data are respectively connected each other respectively.

Preferably, the voltage $V_B$ is a fixed power voltage terminal or a size-adjustable power voltage terminal; and in the case that the voltage VB is the fixed power voltage terminal, a power voltage of the transformer is the size-adjustable power voltage terminal.

Preferably, the digital power amplifier further includes a current mirror; each amplifier unit further includes a fifth MOSFET; the current mirror is composed of a sixth MOSFET and the fifth MOSFETs included in the respective amplifier units; a source and a drain of the fifth MOSFET are connected among the first MOSFET, the second MOSFET and the ground, and a gate of the fifth MOSFET is connected to a gate of the sixth MOSFET; a source and a drain of the sixth MOSFET are connected to the ground, the gates of the fifth MOSFETs and the sixth MOSFET and a bias current; and the gates of the respective fifth MOSFETs in the $2^i$ amplifier units controlled by the $i^{th}$ radio-frequency data are respectively connected each other respectively.

Preferably, thin-oxide low-voltage transistors are used as the first MOSFET and the second MOSFET respectively; and thick-oxide medium-voltage transistors are used as the third MOSFET and the fourth MOSFET.

Preferably, a parasitic capacitance of each of the first MOSFET and the second MOSFET is less than a parasitic capacitance of each of the third MOSFET and the fourth MOSFET.

Compared with the prior art, the present application has the following technical effects: according to the digital radio-frequency transmitter disclosed by the present application, the logic mixing and power amplification can be implemented by a digital mode of the modules, and a circuit layout area and the circuit operation consumption can be effectively reduced.

In a further solution, the digital logic mixer includes a digital logic gate structure, which can effectively prevent a clock from leaking to the output of the power amplifier and improve the quality of a transmission signal output by the radio-frequency transmitter. The digital power amplifier integrates the kinetic energy of the digital-to-analog converter and the power amplifier, which simplifies the structure of the radio-frequency transmitter; and digital baseband input data of the radio-frequency transmitter may be digitally filtered data, which saves the cost of an analog filter.

In a further solution, thin-oxide low-voltage transistors are used as the first MOSFET and the second MOSFET, which can effectively reduce a capacitive load driven by radio-frequency data; and thick-oxide medium-voltage transistors are used as the third MOSFET and the fourth MOSFET, which can isolate a low-voltage transistor from the transformer to protect the working safety of the low-voltage transistor.

DETAILED DESCRIPTION OF THE INVENTION

Embodiments of the present application will be described in detail below. It should be emphasized that the following description is exemplary only, but is not intended to limit the scope of the present application and its application.

It should be noted that when an element is referred to as being "fixed to" or "arranged on" another element, it may be directly located on the other element or indirectly on the other element. When an element is referred to as being "connected to" another element, it may be directly connected to the other element or indirectly to the other element. In addition, such connection may be used for either a fixing function or a circuit/signal communication function.

It should be understood that the orientation or position relations indicated via terms of "length", "width", "upper", "lower", "front", "rear", "left", "right", "vertical", "horizontal", "top", "bottom", "inner", "outer", and the like are based on orientation or the position relations shown in the drawings only to describe the embodiments of the present application conveniently and simplify the description, but not indicate or imply that referred devices or elements must have particular orientations or be constructed and operated with the particular orientation, so that they cannot be construed as limiting of the present application.

Moreover, the terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the description of the embodiments of the present disclosure, unless otherwise stated, the term "a plurality of" means two or more.

Figure 2:
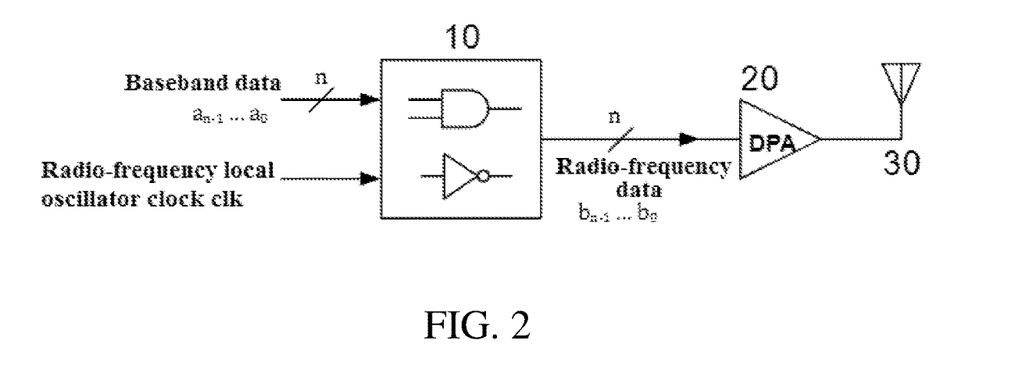
FIG. 2 is a schematic structural diagram of a digital radio-frequency transmitter according to a preferred embodiment of the present application.

As shown in FIG. 2, a preferred embodiment of the present application discloses a digital radio-frequency transmitter, which includes a digital logic mixer 10, a digital power amplifier 20 and an antenna 30, wherein an output terminal of the digital logic mixer 10 is connected to an input terminal of the digital power amplifier 20; an output terminal of the digital power amplifier 20 is connected to the antenna 30; the digital logic mixer 10 is configured to perform logic mixing on baseband data and a radio-frequency local oscillator clock signal which are input into the digital radio-frequency transmitter to generate radio-frequency data; the digital power amplifier 20 is configured to convert the radio-frequency data into an analog power signal; and the antenna 30 is configured to transmit the analog power signal out.

Figure 3:
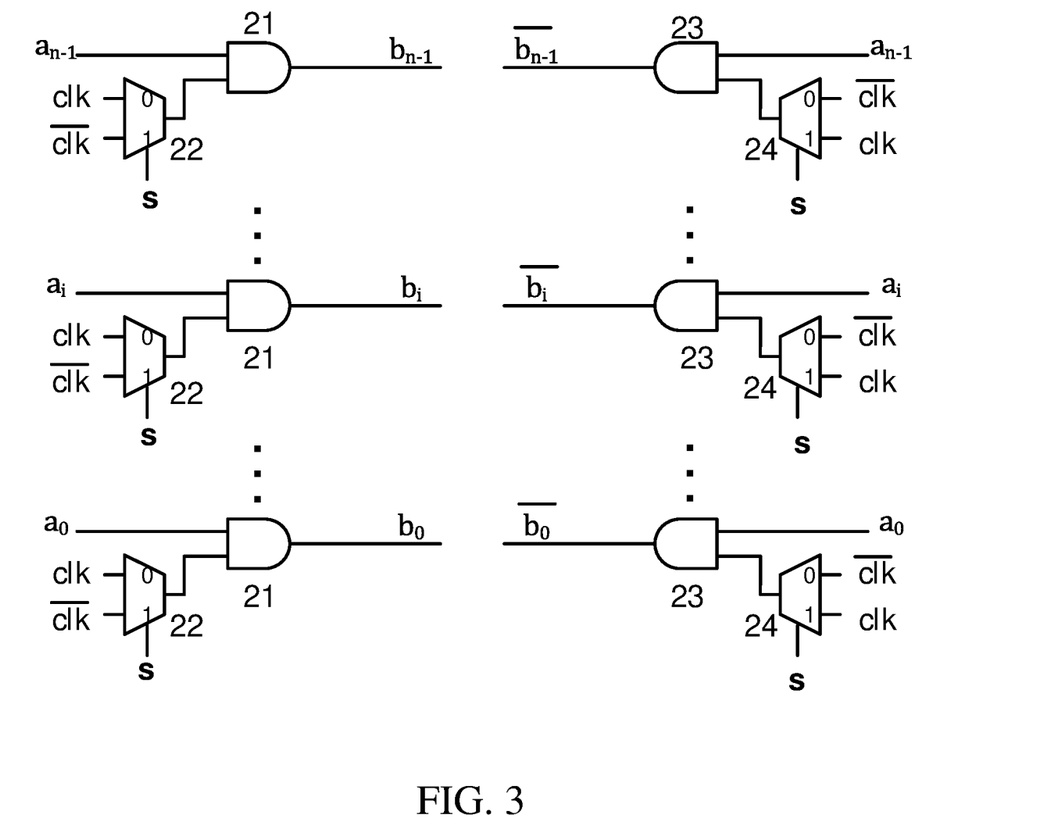
FIG. 3 is a schematic structural diagram of a circuit of a digital logic mixer according to a preferred embodiment of the present application.

As shown in FIG. 3, the digital logic mixer 10 includes n first logic AND gates 21 and n first multiplexers 22, wherein the n first logic AND gates 21 may mix baseband data $a_{n-1} \ldots a_0$ to radio frequency data $b_{n-1} \ldots b_0$ respectively; a first input terminal of the first logic AND gate 21 is a certain bit of baseband data $a_i$, a second input terminal of the first logic AND gate 21 is connected to an output terminal of the corresponding first multiplexer 22, and an output terminal of the first logic AND gate 21 outputs a corresponding bit of radio-frequency data $b_i$; a first input terminal (0 terminal) of the first multiplexer 22 is connected to a radio-frequency local oscillator clock signal clk, a second input terminal (1 terminal) of the first multiplexer 22 is connected to an inversion signal $\overline{clk}$ of the radio-frequency local oscillator clock signal; and the first multiplexer 22 is configured to select the radio-frequency local oscillator clock signal clk or the inversion signal $\overline{clk}$ of the radio frequency local oscillator clock signal according to a sign bit s of the baseband data $a_i$. The frequency of $b_i$ is a radio-frequency local oscillator clock frequency; and a phase of $b_i$ reflects a sign of the input baseband data $a_i$.

Figure 4:
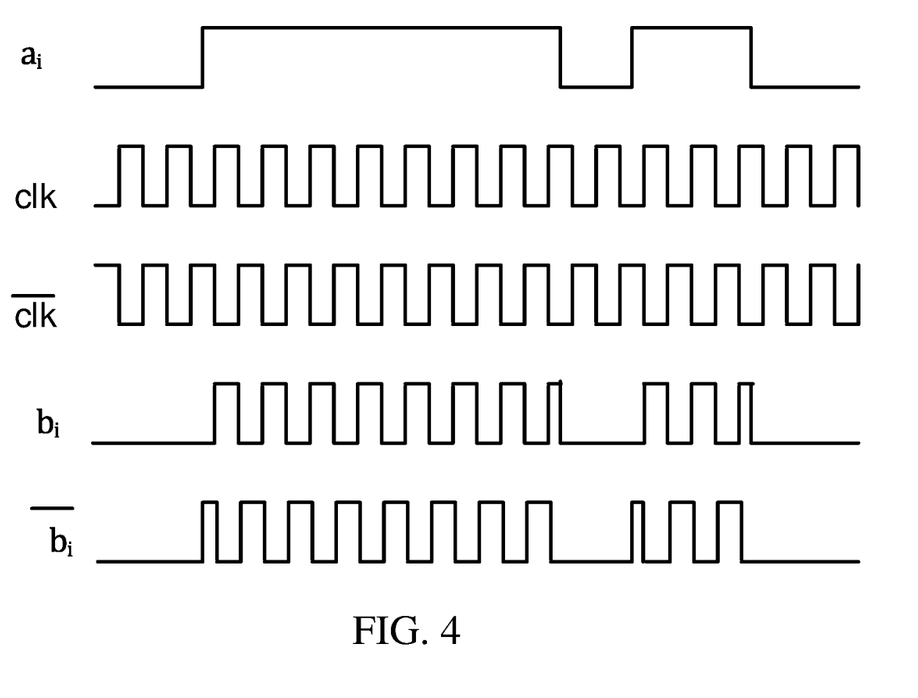
FIG. 4 is a schematic diagram of an input/output signal of the digital logic mixer in FIG. 3.

For a radio-frequency transmitter having a differential output, it is necessary to output radio-frequency data $b_i$ and $\overline{b}_i$. Further, the digital logic mixer 10 further includes n second logic AND gates 23 and n second multiplexers 24, wherein the n second logic AND gates 23 may mix baseband data $a_{n-1} \ldots a_0$ to radio-frequency data $\overline{b}_{n-1}...\overline{b}_0$ respectively; a first input terminal of the second logic AND gate 23 is a certain bit of baseband data $a_i$, a second input terminal of the second logic AND gate 23 is connected to an output terminal of the corresponding second multiplexer 24, and an output terminal of the second logic AND gate 23 outputs a corresponding bit of radio-frequency data $\overline{b}_i$; a first input terminal (0 terminal) of the second multiplexer 24 is connected to an inversion signal $\overline{clk}$ of the radio-frequency local oscillator clock signal, a second input terminal (1 terminal) of the second multiplexer 24 is connected to the radio-frequency local oscillator clock signal clk; and the second multiplexer 24 is configured to select the inversion signal $\overline{clk}$ of the radio-frequency local oscillator clock signal or the radio frequency local oscillator clock signal clk according to a sign bit s of the baseband data $a_i$. The frequency of $\overline{b}_i$ is a radio-frequency local oscillator clock frequency; and a phase of $\overline{b}_i$ reflects a sign of the input baseband data $a_i$. As shown in FIG. 4, $\overline{b}_i$ is an inverted radio-frequency output signal, and a phase of $\overline{b}_i$ is opposite to a positive radio-frequency output signal $b_i$.

The digital power amplifier 20 integrates the functions of a digital-to-analog converter and a power amplifier, and is configured to convert the input radio-frequency data $b_{n-1} \ldots b_0$ into an analog power signal, which is then transmitted output through the antenna 30. For n bits of input radio-frequency data, the digital power amplifier 20 contains $2^n-1$ identical amplifier units, and the $i^{th}$ radio-frequency data $b_i$ controls $2^i$ amplifier units, corresponding to a weight of the $i^{th}$ radio-frequency data $b_i$, thereby implementing the function of analog-to-digital conversion, where $0 \leq i \leq n-1$.

Figure 5:
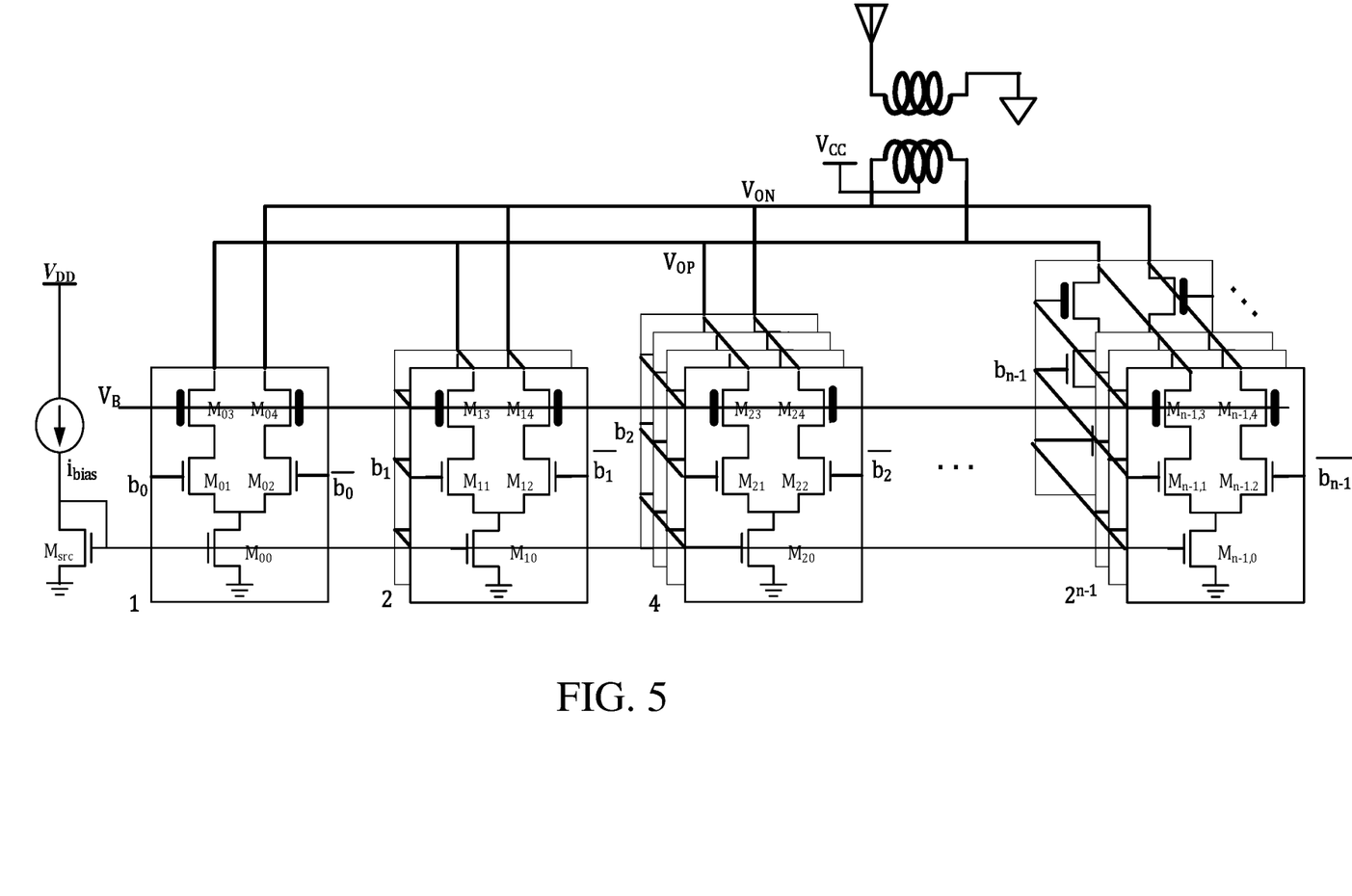
FIG. 5 is a schematic structural diagram of a digital power amplifier in an embodiment of the present application.

As shown in FIG. 5, a circuit structure of a current-mode differential digital power amplifier according to an embodiment of the present application is shown. The digital power amplifier includes a transformer, a current mirror, and $2^n-1$ identical amplifier units, wherein each amplifier unit includes a first MOSFET $M_{i1}$, a second MOSFET $M_{i2}$, a third MOSFET $M_{i3}$, a fourth MOSFET $M_{i4}$ and a fifth MOSFET $M_{i0}$; and the current mirror is composed of a sixth MOSFET $M_{src}$ and the fifth MOSFETs $M_{i0}$ ($0 \leq i \leq n-1$) of the respective amplifier units to mirror-copy a bias current $i_{bias}$ to the respective amplifier units. The gates of the respective MOSFETs in the $2^i$ amplifier units controlled by the $i^{th}$ radio-frequency data are respectively connected each other respectively (i.e., the gates of the first MOSFETs $M_{i1}$ in the $2^i$ amplifier units controlled by the $i^{th}$ radio frequency data are connected each other; the gates of the second MOSFETs $M_{i2}$ are connected each other; the gates of the third MOSFETs $M_{i3}$ are connected each other; the gates of the fourth MOSFETs $M_{i4}$ are connected each other; and the gates of the fifth MOSFETs $M_{i0}$ are connected each other); a gate of the fifth MOSFET is connected to a gate of the sixth MOSFET, a source and a drain of the sixth MOSFET are connected to the ground, the gates of the fifth MOSFET and the sixth MOSFET and a bias current respectively, one terminal of each of a source and a drain of the fifth MOSFET $M_{i0}$ is connected to the ground, and the other terminal of each of the source and the drain of the fifth MOSFET $M_{i0}$ is connected to the first MOSFET $M_{i1}$ and the second MOSFET $M_{i2}$; the gate of the first MOSFET $M_{i1}$ is connected to the radio-frequency data $b_i$, and the source and the drain of the first MOSFET $M_{i1}$ are connected to the fifth MOSFET $M_{i0}$ and the third MOSFET $M_{i3}$ respectively; the gate of the second MOSFET $M_{i2}$ is connected to the radio-frequency data $\overline{b}_i$, and the source and the drain of the second MOSFET $M_{i2}$ are connected to fifth MOSFET $M_{i0}$ and the fourth MOSFET $M_{i4}$ respectively; the gates of the third MOSFET $M_{i3}$ and the fourth MOSFET $M_{i4}$ are connected to a voltage $V_B$ (in this embodiment, the voltage $V_B$ is a fixed value by default, and the current is adjusted by the current mirror), the source and the drain of the third MOSFET $M_{i3}$ are respectively connected to the first MOSFET $M_{i1}$ and a positive output $V_{OP}$, and the source and drain of the fourth MOSFET $M_{i4}$ are respectively connected to the second MOSFET $M_{i2}$ and a negative output $V_{ON}$; and the positive output $V_{OP}$ and the negative output $V_{ON}$ are respectively connected to the positive and negative terminals of the primary side of the transformer, and a power voltage of the primary side of the transformer is $V_{CC}$.

The circuit of the digital power amplifier can control the current of each amplifier unit by adjusting the bias current $i_{bias}$, thereby changing the power of an output signal. The first MOSFET $M_{i1}$ and the second MOSFET $M_{i2}$ in the middle are used as switching tubes; and the radio-frequency data $b_i$ and $\overline{b}_i$ are connected to the gates of the two MOSFETs respectively, so as to control the bias current of the fifth MOSFET $M_{i0}$ in this unit to flow to the positive output $V_{OP}$ or the negative output $V_{ON}$ of the differential power amplifier. The output terminals of all the amplifier units are connected together to generate analog current signals represented by the radio-frequency data $b_{n-1} \ldots b_0$, thereby driving the primary side of the transformer. The induced voltage current generated at a secondary side of the transformer drives the antenna to emit radio-frequency signals represented by $b_{n-1} \ldots b_0$.

Since the frequency of the radio-frequency data $b_i$ and $\overline{b}_i$ is the radio-frequency local oscillator clock frequency and is relatively high (for example, the frequency for a UWB application may be up to 9.48 GHz), thereby limiting the size of the capacitive load that can be driven by the radio-frequency input data. In this embodiment, the first MOSFET $M_{i1}$ and the second MOSFET $M_{i2}$ are implemented by thin-oxide low-voltage transistors. The low-voltage MOSFET uses a minimum channel length in this process, and meanwhile a channel width for realizing a certain driving capability is correspondingly reduced, thereby effectively reducing the dimension of the MOSFET and the magnitude of the parasitic capacitance. Therefore, the low-voltage transistors may be used to reduce the capacitive load driven by the radio-frequency data $b_i$ and $\overline{b}_i$. Specifically, the minimum dimension that can be used by the low-voltage MOSFET is related to a process. For example, a minimum channel length of a 40 nm process is about 40 nm, and a minimum channel length of a 22 nm process is about 25 nm. The channel length and the area of the MOSFET are reduced, and the corresponding parasitic capacitance is correspondingly reduced. For another example, in the 22 nm process, a minimum channel length of a 0.8V low-voltage transistor is about 25 nm, a minimum channel length of a 3.3V medium-voltage transistor is 550 nm, and the area and the parasitic capacitance are increased by more than dozens of times.

A voltage amplitude of an output signal of the power amplifier determines the output power. The application of high output power requires that the power voltage $V_{CC}$ of the primary side of the transformer may exceed a withstand voltage of the low-voltage transistor. Therefore, in this embodiment, thick-oxide 3.3V medium-voltage transistors are used as the third MOSFET $M_{i3}$ and the fourth MOSFET $M_{i4}$ to isolate a lower-layer low-voltage transistor from an upper-layer transformer. The thick-oxide 3.3V medium-voltage transistor limits a voltage between a source and a drain of the lower-layer low-voltage transistor not to exceed its withstand voltage value, thereby protecting the working safety of the lower-layer low-voltage transistor.

In this embodiment, the thin-oxide low-voltage transistors are used as the first MOSFET $M_{i1}$ and the second MOSFET $M_{i2}$, and the thick-oxide medium-voltage transistors are used as the third MOSFET $M_{i3}$ and the fourth MOSFET $M_{i4}$, wherein the voltage ranges of the low-voltage transistor and the medium-voltage transistor vary according to different processes. Those skilled in the art can understand that the low-voltage transistor is a commonly used core device (a device used inside a chip), and the medium-voltage transistor is a commonly used I/O device (a device used when the chip interacts with an external interface). For example, in the commonly used tsmc (Taiwan Semiconductor Manufacturing Company) 40 nm process, MOSFETs of 0.9V, 3.3V and 5V are used, that is, typical voltage values of the MOSFETs in operation are 0.9V, 3.3V, 5V, respectively. In general cases, the MOSFET of 0.9V is referred to as a low-voltage transistor, and the MOSFET of 3.3V is referred to as a medium-voltage transistor. Silica between a gate and a channel of the MOSFET of 0.9V is relatively thin, and silica between a gate and a channel of the MOSFET of 3.3V is relatively thick, which are distinguished as the thin-oxide low-voltage transistor and the thick-oxide medium-voltage transistor. The specific thickness depends on process parameters.

Figure 6:
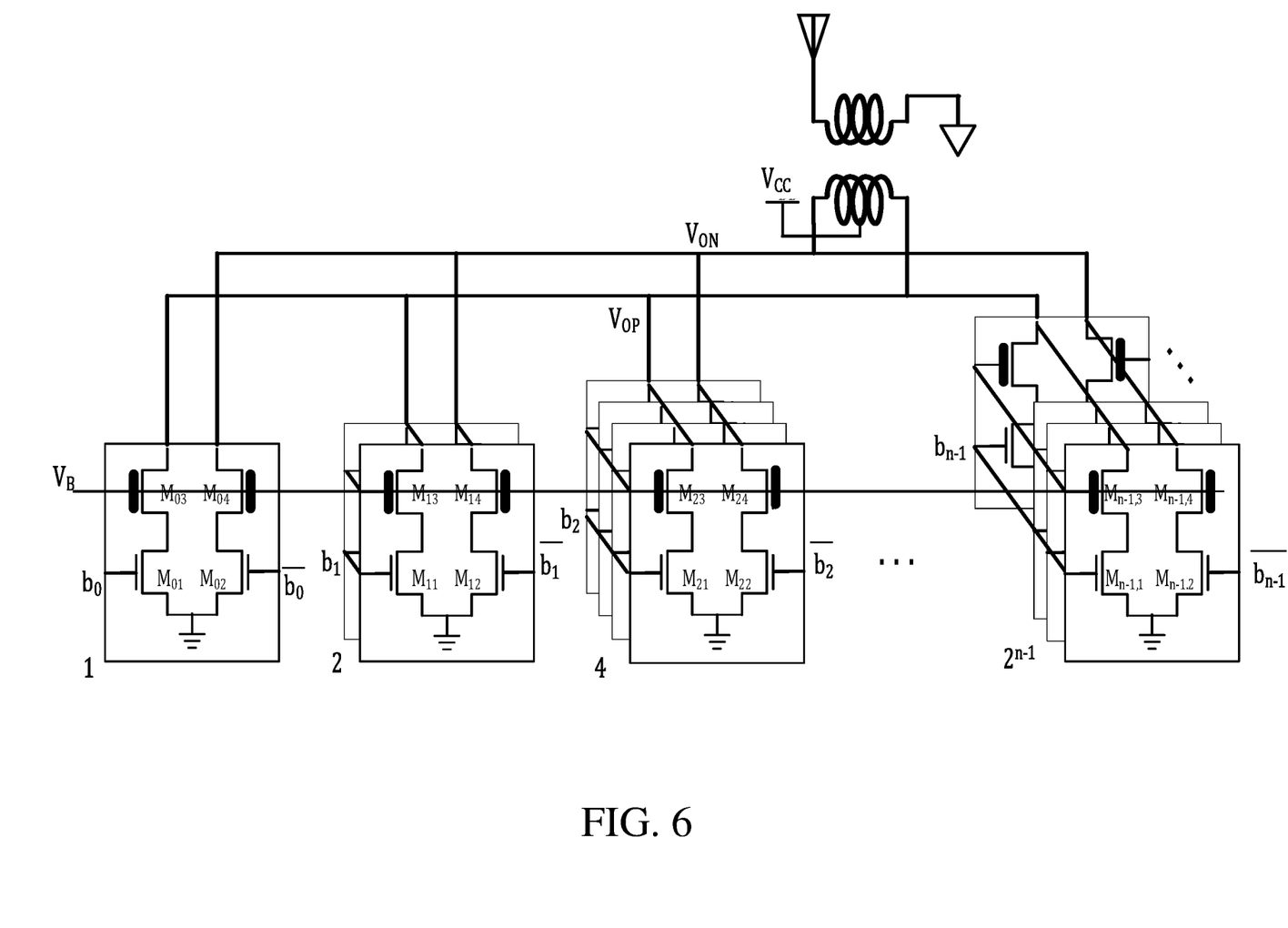
FIG. 6 is a schematic structural diagram of the digital power amplifier according to another embodiment of the present application.

As shown in FIG. 6, a circuit structure of a current-mode differential digital power amplifier according to another embodiment of the present application is shown. In this embodiment, the fifth MOSFET $M_{i0}$, the third MOSFET $M_{i3}$ and the fourth MOSFET $M_{i4}$ in the current mirror are merged. The current flowing through this amplifier unit is controlled by the gate voltage $V_B$ of the third MOSFET $M_{i3}$ and the fourth MOSFET $M_{i4}$ to directly adjust the bias current through the gate voltage $V_B$, and the output power of the digital radio-frequency transmitter can be changed by adjusting the magnitude of the gate voltage $V_B$. That is, the digital power amplifier in this embodiment does not include the current mirror, and one terminal of each of the sources and the drains of the first MOSFET $M_{i1}$ and the second MOSFET $M_{i2}$ is grounded directly. On this basis, in some other embodiments, the gate voltage $V_B$ may also be connected to a certain fixed power voltage, and a branch bias current is generated by an on-resistance of the MOSFET connected to each branch. The magnitude of the branch bias current can be changed by adjusting the power voltage $V_{CC}$ of the transformer, thereby controlling the output power of the transmitter.

In this embodiment of the present application, the digital radio-frequency transmitter integrates the digital-to-analog converter and the power amplifier into a digital power amplifier, thereby simplifying the structure of the radio-frequency transmitter. The low-pass filter may be implemented in a digital domain by a digital filtering algorithm. The digital baseband input data of the radio-frequency transmitter may be digitally filtered data, which can save the cost of an analog filter. The radio-frequency mixing circuit may also implemented digitally, and the transmission baseband digital input data and the radio-frequency clock are mixed through a digital logic gate. The digital logic gate can effectively prevent clock leakage to the power amplifier output. In addition, the digital implementation of the modules can further reduce the circuit layout area and circuit power consumption.

The Background section of the present application may contain background information about the problem or environment of the present application, rather than the prior art described by others. Therefore, the content included in the Background section is not an admission of the applicant to the prior art.

The above content is a further detailed description of the present application in conjunction with specific/preferred embodiments, and it cannot be considered that the specific embodiments of the present disclosure are limited to these descriptions. For those of ordinary skill in the technical field to which the present application belongs, several substitutions or deformations can also be made to these described embodiments, which should be regarded as falling within the protection scope of the present application. In the description of the present specification, the description of referring terms such as "an embodiment", "some embodiments", "a preferred embodiment", "an example", "a specific example" and "some examples" integrate particular features, structures, materials or characteristics described in combination of the embodiments or examples and included in at least one embodiment or example of the present application. In the description, schematic description of the above terms does not necessarily refer to the same embodiment or example. Furthermore, the described particular features, structures, materials or characteristics can be integrated with any one or more embodiments or examples in a proper manner. In addition, in the absence of contradiction, a person skilled in the art can integrate and combine different embodiments or examples described in this specification and the features of different embodiments or examples. Although the embodiments of the present application and their advantages have been described in detail, it should be understood that various changes, substitutions and alterations can be made herein without departing from the scope as defined by the appended claims.

What is claimed is:

1. A digital radio-frequency transmitter, comprising a digital logic mixer, a digital power amplifier and an antenna, wherein an output terminal of the digital logic mixer is connected with an input terminal of the digital power amplifier; an output terminal of the digital power amplifier is connected to the antenna; the digital logic mixer is configured to perform logic mixing on baseband data and a radio-frequency local oscillator clock signal which are input into the digital radio-frequency transmitter to generate radio-frequency data; the digital power amplifier is configured to convert the radio-frequency data into an analog power signal; and the antenna is configured to transmit the analog power signal out;

wherein the digital logic mixer comprises a first logic AND gate and a first multiplexer, wherein a first input terminal of the first logic AND gate is the baseband data, a second input terminal of the first logic AND gate is connected to an output terminal of the first multiplexer, and an output terminal of the first logic AND gate is configured to output the radio-frequency data; a first input terminal of the first multiplexer is connected to the radio-frequency local oscillator clock signal, and a second input terminal of the first multiplexer is connected to an inversion signal of the radio-frequency local oscillator clock signal; and the first multiplexer is configured to select the radio-frequency local oscillator clock signal or the inversion signal of the radio-frequency local oscillator clock signal according to a sign bit of the baseband data.

2. The digital radio-frequency transmitter according to claim 1, wherein the baseband data input to the digital radio-frequency transmitter is data that is digitally filtered through a digital filtering algorithm.

3. The digital radio-frequency transmitter according to claim 1, wherein the digital logic mixer further comprises a second logic AND gate and a second multiplexer, wherein a first input terminal of the second logic AND gate is the baseband data, a second input terminal of the second logic AND gate is connected to an output terminal of the second multiplexer, and an output terminal of the second logic AND gate is configured to output the radio-frequency data; a first input terminal of the second multiplexer is connected to an inversion signal of the radio-frequency local oscillator clock signal, and a second input terminal of the second multiplexer is connected to the radio-frequency local oscillator clock signal; and the second multiplexer is configured to select the inversion signal of the radio-frequency local oscillator clock signal or the radio-frequency local oscillator clock signal according to the sign bit of the baseband data.

4. The digital radio-frequency transmitter according to claim 1, wherein the digital power amplifier comprises a transformer and $2^n-1$ identical amplifier units, n being a number of bits of the radio-frequency data; and an $i^{th}$ radio-frequency data controls $2^i$ amplifier units, $0 \leq i \leq n-1$.

5. The digital radio-frequency transmitter according to claim 4, wherein each amplifier unit comprises a switching tube, a current regulation module and an isolation module; an input terminal of the switching tube is connected to the radio-frequency data; the current regulation module is connected to the switching tube and configured to adjust a current of each of the amplifier units; and the isolation module is connected between an input terminal of the transformer and an output terminal of the switching tube and configured to isolate the switching tube from the transformer.

6. The digital radio-frequency transmitter according to claim 4, wherein each amplifier unit comprises a first MOSFET, a second MOSFET, a third MOSFET and a fourth MOSFET; a gate of the first MOSFET and a gate of the second MOSFET are connected to the radio-frequency data respectively; a gate of the third MOSFET and a gate of the fourth MOSFET are connected to a voltage $V_B$ respectively; a source and a drain of the first MOSFET are connected to a ground and the third MOSFET respectively; a source and a drain of the second MOSFET are connected to the ground and the fourth MOSFET respectively; a source and a drain of the third MOSFET are connected to the first MOSFET and a positive output $V_{OP}$ respectively; a source and a drain of the fourth MOSFET are connected to the second MOSFET and a negative output $V_{ON}$ respectively; the positive output $V_{OP}$ and the negative output $V_{ON}$ are connected to a positive terminal and a negative terminal of a primary side of the transformer respectively; and the gates of the respective MOSFETs in the $2^i$ amplifier units controlled by the $i^{th}$ radio-frequency data are respectively connected each other respectively.

7. The digital radio-frequency transmitter according to claim 6, wherein the voltage $V_B$ is a fixed power voltage terminal or a size-adjustable power voltage terminal; and in the case that the voltage VB is the fixed power voltage terminal, a power voltage of the transformer is the size-adjustable power voltage terminal.

8. The digital radio-frequency transmitter according to claim 7, wherein thin-oxide low-voltage transistors are used as the first MOSFET and the second MOSFET respectively; and thick-oxide medium-voltage transistors are used as the third MOSFET and the fourth MOSFET.

9. The digital radio-frequency transmitter according to claim 6, wherein the digital power amplifier further comprises a current mirror; each amplifier unit further comprises a fifth MOSFET; the current mirror is composed of a sixth MOSFET and the fifth MOSFETs included in the respective amplifier units; a source and a drain of the fifth MOSFET are connected among the first MOSFET, the second MOSFET and the ground, and a gate of the fifth MOSFET is connected to a gate of the sixth MOSFET; a source and a drain of the sixth MOSFET are connected to the ground, the gates of the fifth MOSFETs and the sixth MOSFET and a bias current; and the gates of the respective fifth MOSFETs in the $2^i$ amplifier units controlled by the $i^{th}$ radio-frequency data are respectively connected each other respectively.

10. The digital radio-frequency transmitter according to claim 9, wherein thin-oxide low-voltage transistors are used as the first MOSFET and the second MOSFET respectively; and thick-oxide medium-voltage transistors are used as the third MOSFET and the fourth MOSFET.

11. The digital radio-frequency transmitter according to claim 6, wherein thin-oxide low-voltage transistors are used as the first MOSFET and the second MOSFET respectively; and thick-oxide medium-voltage transistors are used as the third MOSFET and the fourth MOSFET.

12. A digital radio-frequency transmitter, comprising a digital logic mixer, a digital power amplifier and an antenna, wherein an output terminal of the digital logic mixer is connected with an input terminal of the digital power amplifier; an output terminal of the digital power amplifier is connected to the antenna; the digital logic mixer is configured to perform logic mixing on baseband data and a radio-frequency local oscillator clock signal which are input into the digital radio-frequency transmitter to generate radio-frequency data; the digital power amplifier is configured to convert the radio-frequency data into an analog power signal; and the antenna is configured to transmit the analog power signal out;

wherein the digital power amplifier comprises a transformer and $2^n-1$ identical amplifier units, n being a number of bits of the radio-frequency data; and an $i^{th}$ radio-frequency data controls $2^i$ amplifier units, $0 \leq i \leq n-1$.

13. The digital radio-frequency transmitter according to claim 12, wherein the baseband data input to the digital radio-frequency transmitter is data that is digitally filtered through a digital filtering algorithm.

14. The digital radio-frequency transmitter according to claim 12, wherein the digital logic mixer comprises a first logic AND gate and a first multiplexer, wherein a first input terminal of the first logic AND gate is the baseband data, a second input terminal of the first logic AND gate is connected to an output terminal of the first multiplexer, and an output terminal of the first logic AND gate is configured to output the radio-frequency data; a first input terminal of the first multiplexer is connected to the radio-frequency local oscillator clock signal, and a second input terminal of the first multiplexer is connected to an inversion signal of the radio-frequency local oscillator clock signal; and the first multiplexer is configured to select the radio-frequency local oscillator clock signal or the inversion signal of the radio-frequency local oscillator clock signal according to a sign bit of the baseband data;

wherein the digital logic mixer further comprises a second logic AND gate and a second multiplexer, wherein a first input terminal of the second logic AND gate is the baseband data, a second input terminal of the second logic AND gate is connected to an output terminal of the second multiplexer, and an output terminal of the second logic AND gate is configured to output the radio-frequency data; a first input terminal of the second multiplexer is connected to an inversion signal of the radio-frequency local oscillator clock signal, and a second input terminal of the second multiplexer is connected to the radio-frequency local oscillator clock signal; and the second multiplexer is configured to select the inversion signal of the radio-frequency local oscillator clock signal or the radio-frequency local oscillator clock signal according to the sign bit of the baseband data.

15. The digital radio-frequency transmitter according to claim 12, wherein each amplifier unit comprises a switching tube, a current regulation module and an isolation module; an input terminal of the switching tube is connected to the radio-frequency data; the current regulation module is connected to the switching tube and configured to adjust a current of each of the amplifier units; and the isolation module is connected between an input terminal of the transformer and an output terminal of the switching tube and configured to isolate the switching tube from the transformer.

16. The digital radio-frequency transmitter according to claim 12, wherein each amplifier unit comprises a first MOSFET, a second MOSFET, a third MOSFET and a fourth MOSFET; a gate of the first MOSFET and a gate of the second MOSFET are connected to the radio-frequency data respectively; a gate of the third MOSFET and a gate of the fourth MOSFET are connected to a voltage $V_B$ respectively; a source and a drain of the first MOSFET are connected to a ground and the third MOSFET respectively; a source and a drain of the second MOSFET are connected to the ground and the fourth MOSFET respectively; a source and a drain of the third MOSFET are connected to the first MOSFET and a positive output $V_{OP}$ respectively; a source and a drain of the fourth MOSFET are connected to the second MOSFET and a negative output $V_{ON}$ respectively; the positive output $V_{OP}$ and the negative output $V_{ON}$ are connected to a positive terminal and a negative terminal of a primary side of the transformer respectively; and the gates of the respective MOSFETs in the $2^i$ amplifier units controlled by the $i^{th}$ radio-frequency data are respectively connected each other respectively.

17. The digital radio-frequency transmitter according to claim 16, wherein the voltage $V_B$ is a fixed power voltage terminal or a size-adjustable power voltage terminal; and in the case that the voltage VB is the fixed power voltage terminal, a power voltage of the transformer is the size-adjustable power voltage terminal.

18. The digital radio-frequency transmitter according to claim 17, wherein thin-oxide low-voltage transistors are used as the first MOSFET and the second MOSFET respectively; and thick-oxide medium-voltage transistors are used as the third MOSFET and the fourth MOSFET.

19. The digital radio-frequency transmitter according to claim 16, wherein the digital power amplifier further comprises a current mirror; each amplifier unit further comprises a fifth MOSFET; the current mirror is composed of a sixth MOSFET and the fifth MOSFETs included in the respective amplifier units; a source and a drain of the fifth MOSFET are connected among the first MOSFET, the second MOSFET and the ground, and a gate of the fifth MOSFET is connected to a gate of the sixth MOSFET; a source and a drain of the sixth MOSFET are connected to the ground, the gates of the fifth MOSFETs and the sixth MOSFET and a bias current; and the gates of the respective fifth MOSFETs in the $2^i$ amplifier units controlled by the $i^{th}$ radio-frequency data are respectively connected each other respectively.

20. The digital radio-frequency transmitter according to claim 16, wherein thin-oxide low-voltage transistors are used as the first MOSFET and the second MOSFET respectively; and thick-oxide medium-voltage transistors are used as the third MOSFET and the fourth MOSFET.

* * * * *